United States Patent
Park et al.

(10) Patent No.: US 10,152,472 B2
(45) Date of Patent: Dec. 11, 2018

(54) APPARATUS AND METHOD FOR GENERATING SUMMARY DATA OF E-BOOK OR E-NOTE

(75) Inventors: Jeong-Wan Park, Seoul (KR); Seong-Taek Hwang, Gyeonggi-do (KR); Jung-Rim Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 731 days.

(21) Appl. No.: 13/559,021

(22) Filed: Jul. 26, 2012

(65) Prior Publication Data
US 2013/0031473 A1 Jan. 31, 2013

(30) Foreign Application Priority Data
Jul. 26, 2011 (KR) .................. 10-2011-0073968

(51) Int. Cl.
G06F 17/00 (2006.01)
G06F 17/27 (2006.01)
G06F 17/30 (2006.01)

(52) U.S. Cl.
CPC .... G06F 17/2745 (2013.01); G06F 17/30719 (2013.01)

(58) Field of Classification Search
CPC ............... G06F 17/2745; G06F 17/241; G06F 17/30719
USPC .................. 715/230-233, 254, 200
See application file for complete search history.

(56) References Cited

U.S. PATENT DOCUMENTS

| 6,279,014 | B1 * | 8/2001 | Schilit et al. ............... 715/234 |
| 8,118,224 | B2 * | 2/2012 | Barsness ........... G06F 17/30716 235/375 |
| 2003/0117378 | A1 * | 6/2003 | Carro ................ G06F 3/04883 345/173 |
| 2004/0034832 | A1 | 2/2004 | Taylor et al. |
| 2004/0034835 | A1 * | 2/2004 | Kuruoglu et al. ........... 715/530 |
| 2004/0093565 | A1 * | 5/2004 | Bernstein .............. G06F 17/242 715/268 |
| 2004/0117740 | A1 | 6/2004 | Chen et al. |

(Continued)

FOREIGN PATENT DOCUMENTS

| JP | 2004199680 | 7/2004 |
| KR | 1020110034808 | 4/2011 |
| KR | 1020110034810 | 4/2011 |

OTHER PUBLICATIONS

Good Reader User Manual https://web.archive.org/web/20110714162155/http://www.goodiware.com/gr-man-view-pdf.html.*

(Continued)

*Primary Examiner* — Manglesh M Patel
(74) *Attorney, Agent, or Firm* — The Farrell Law Firm, P.C.

(57) ABSTRACT

An apparatus and method for generating summary data of an e-book or e-note, the method including if input data is received, recognizing a type of the input data, extracting a character region in the e-book or e-note corresponding to the recognized input data type, storing page information corresponding to the extracted character region, and generating summary data by using the page information corresponding to the character region when the generation of the summary data is requested, thereby allowing a user to preview summary content handwritten by the user on the e-book or e-note at a glance.

18 Claims, 5 Drawing Sheets

(56) References Cited

U.S. PATENT DOCUMENTS

| | | | |
|---|---|---|---|
| 2004/0163042 A1* | 8/2004 | Altman | 715/512 |
| 2005/0273700 A1* | 12/2005 | Champion et al. | 715/512 |
| 2006/0050969 A1* | 3/2006 | Shilman | G06F 3/04883 |
| | | | 382/224 |
| 2008/0141182 A1 | 6/2008 | Barsness et al. | |
| 2012/0036423 A1* | 2/2012 | Haynes, II | G06Q 30/0201 |
| | | | 715/230 |
| 2012/0246633 A1 | 9/2012 | Nam | |
| 2016/0034430 A1* | 2/2016 | Beavers | G06F 3/0483 |
| | | | 715/205 |

OTHER PUBLICATIONS

Sony, Reader Pocket Edition, Published 2010, Sony Corp., pp. 1-131 (pdf).*
Sony Reader.(PRS-600) User's Guide, Digital Book Reader, 2009, 190 Pages.
Korean Office Action dated Mar. 8, 2018 issued in counterpart application No. 10-2011-0116962, 9 pages.
Korean Office Action dated Sep. 20, 2018 issued in counterpart application No. 10-2011-0116962, 6 pages.

* cited by examiner 311   301

When a request for storing a screen displaying handwriting data thereon is received, a controller(100) controls input image generating unit(130) to capture the screen displaying handwriting data thereon and stores a captured screen as input image in a memory unit(140). Here, the screen displaying handwriting data thereon may be a touch screen or a tablet input/output screen in a case where an input unit is the touch screen or a device, such as a tablet PC, capable of displaying an input and output screen or an output display screen in a case where an input touch panel and the output display screen are separated.
A controller(100) control character recognition unit(140) to recognize a character of input image....

When a request for storing a screen displaying handwriting data thereon is received, a controller(100) controls input image generating unit(130) to capture the screen displaying handwriting data thereon and stores a captured screen as input image in a memory unit(140). Here, the screen displaying handwriting data thereon may be a touch screen or a tablet input/output screen in a case where an input unit is the touch screen or a device, such as a tablet PC, capable of displaying an input and output screen or an output display screen in a case where an input touch panel and the output display screen are separated.
A controller(100) control character recognition unit(140) to recognize a character of input image....

APPARATUS AND METHOD FOR GENERATING SUMMARY DATA OF E-BOOK OR E-NOTE

PRIORITY

This application claims priority under 35 U.S.C. § 119(a) to a Korean Patent Application filed in the Korean Intellectual Property Office on Jul. 26, 2011 and assigned Serial No. 10-2011-073968, the entire disclosure of which is incorporated herein by reference.

BACKGROUND OF THE INVENTION

1. Field of the Invention

The present invention relates generally to an apparatus for providing an e-book or e-note, and more particularly, to an apparatus and method for generating summary data obtained by gathering memos of a user and content indicated by indicators, such as underlining, in an e-book or e-note.

2. Description of the Related Art

Generally, e-books consisting of, for example, Joint Photographic Experts Group (JPEG) images are displayed as an image on a screen of a portable terminal at the request of the user. While viewing or reading e-books or e-notes, users index an important sentence on a specific page by underlining the important sentence or handwrite a memo regarding the important sentence. Having run an e-book or e-note, the terminal may store in a database the unique numbers of a page and a paragraph having a sentence indexed on the e-book or e-note by a user, and go to the indexed page of the e-book or e-note when the user selects the index. These e-books or e-notes display content of a page corresponding to a link of the page including an index on the screen so that the user can preview the selected and linked page.

As described above, since the conventional e-books or e-notes generate an index of a handwritten or underlined page and use the generated index for a shortcut, it is difficult for the user to preview summaries of the e-books or e-notes.

In addition, conventionally, a shortcut is used to select an index, in order to view the content of the indexed page, which is inconvenient to the user.

SUMMARY OF THE INVENTION

Accordingly, the present invention has been made to solve the above-stated problems occurring in the prior art, and the present invention provides an apparatus and method for generating summary data to allow a user to preview content of an e-book or e-note at a glance, with summarized content handwritten by the user.

According to one aspect of the present invention, there is provided an apparatus for generating summary data of an e-book or e-note, including an input data recognizer for recognizing a type of input data, a character region extractor for extracting a character region in the e-book or e-note corresponding to the recognized input data type, a summary data generator for generating summary data including the character region, and a controller for storing page information corresponding to the character region extracted by the character region extractor according to the input data type recognized by the input data recognizer and controlling the summary data generator to generate the summary data by using the page information corresponding to the character region when the generation of the summary data is requested.

According to another aspect of the present invention, there is provided a method of generating summary data of an e-book or e-note, including if input data is received, recognizing a type of the input data, extracting a character region in the e-book or e-note corresponding to the recognized input data type, storing page information corresponding to the extracted character region, and generating summary data by using the page information corresponding to the character region when the generation of the summary data is requested.

BRIEF DESCRIPTION OF THE DRAWINGS

The above and other objects, features and advantages of the present invention will become more apparent from the following detailed description when taken in conjunction with the accompanying drawing in which:

FIG. 2 is a diagram illustrating a character region including characters at a location matched with a location of indicator data according to an embodiment of the present invention;

FIG. 3 is a diagram illustrating a character region including a sentence at a location matched with a location of indicator data according to an embodiment of the present invention;

DETAILED DESCRIPTION OF THE EMBODIMENTS OF THE PRESENT INVENTION

Various embodiments of the present invention will be described in detail with reference to the accompanying drawings. In the following description and the accompanying drawings, detailed descriptions of well-known functions or constructions are omitted to avoid obscuring the description of the present invention with unnecessary detail.

Figure 1:
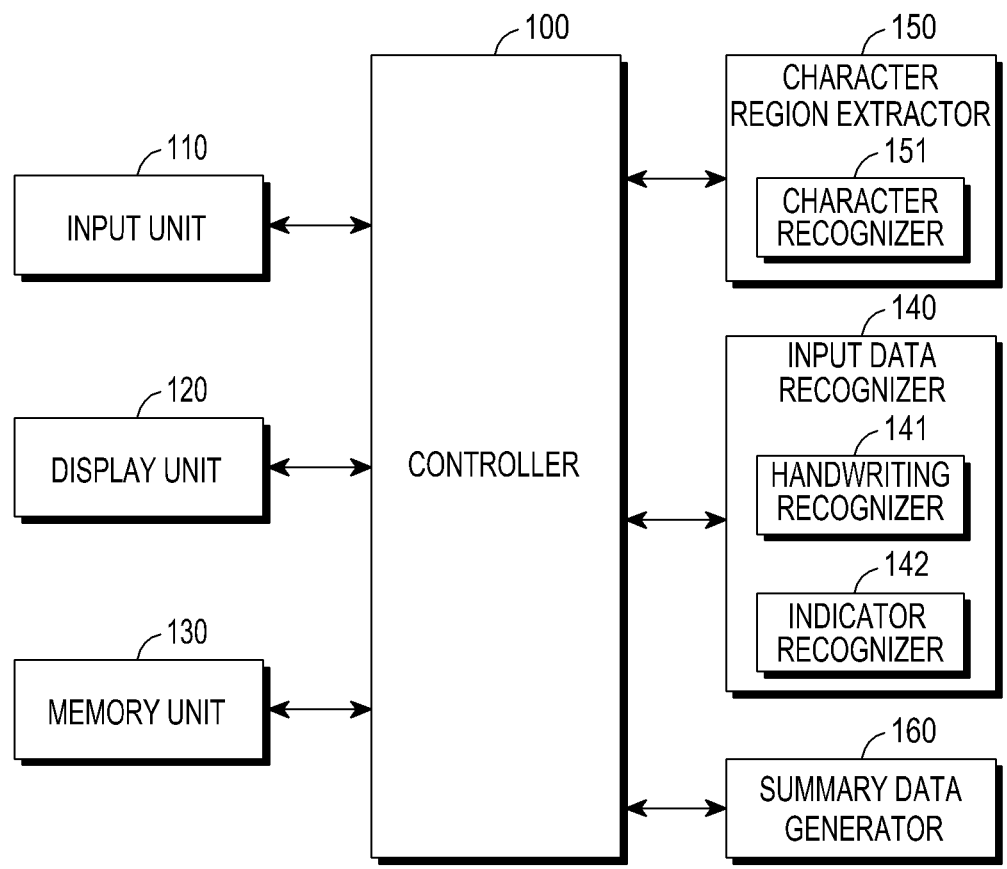
FIG. 1 is a diagram illustrating a structure of an apparatus for generating summary data according to an embodiment of the present invention.

FIG. 1 is a diagram illustrating a structure of an apparatus for generating summary data according to an embodiment of the present invention.

Referring to FIG. 1, the summary data generating apparatus includes a controller 100, an input unit 110, a display unit 120, a memory unit 130, an input data recognizer 140, a character region extractor 150, and a summary data generator 160.

The controller 100 controls the overall operation of the summary data generating apparatus. The controller 100 performs an e-paper function when a function execution request on an e-paper, such as an e-book or e-note, is received via the input unit 110.

If user input data for generating summary data is received via the input unit 110, the controller 100 controls the input data recognizer 140 to recognize the received user input data and determine whether the received user input data is handwriting data or indicator data. According to an embodiment of the present invention, the controller 100 recognizes user input data input after receipt of a predetermined function key input for generating summary data, as the user input data for generating summary data, in order to distinguish user input data for generating summary data from user input data for performing a typical e-paper function, such as a page flip. As another example, handwriting gestures may be used to distinguish user input data for generating summary data from user input data for performing a typical e-paper function. That is, to identify user input data for generating summary data, the controller 100 stores a predetermined handwriting gesture in advance, and when the predetermined handwriting gesture is executed, the controller 100 determines that the predetermined handwriting gesture is user input data for generating summary data.

If it is determined that the received user input data is handwriting data, the controller 100 extracts a handwriting region corresponding to the recognized handwriting data and stores information regarding the extracted handwriting region in the memory unit 130. The handwriting region information includes a page number of the e-paper from which the handwriting region is extracted and location information of the handwriting region on the page.

If it is determined that the received user input data is indicator data, such as a line, the controller 100 controls the character region extractor 150 to extract a character region corresponding to the indicator data recognized on a relevant page of the e-paper. The character region corresponding to the indicator data may be a region including characters at a location matched with a location of the indicator data on the page or a region including a sentence at the location matched with the location of the indicator data.

The controller 100 stores information regarding the character region extracted by the character region extractor 150 in the memory unit 130. The character region information includes a page number of the e-paper from which the character region is extracted and location information of the character region on the page.

Upon receiving a summary data display request, the controller 100 controls the summary data generator 160 to capture a character image corresponding to the character region information and a handwriting image corresponding to the handwriting region information in the e-paper and generate summary data including the captured character image and handwriting image. The summary data is arranged to fit within the layout structure of the page of the e-book or e-note so that the summary data and the page are combined as a single image. If the summary data is out of a height range of the layout structure of the page, the page may be divided into multiple pages.

Thereafter, the controller 100 controls the display unit 120 to display the generated summary data. A screen for displaying the summary data may include at least one character image or include at least one character image and at least one handwriting image.

Furthermore, according to an embodiment of the present invention, a shortcut function may be set to directly display a page in an e-paper from which a character image is captured in correspondence with each character image or handwriting image in summary data. Accordingly, if the user selects a specific character image on a screen by using the input unit 110, the controller 100 controls the display unit 120 to display a page in the e-paper that corresponds to the selected specific character image by performing the set shortcut function in response to the selection of the specific character image.

In addition, when summary data is generated, a document may be generated instead of an image. For example, if a request for generating summary data as a document is received, the controller 100 controls a character recognizer 151 to recognize characters in the character region corresponding to the stored character region information and controls a handwriting recognizer 141 to recognize handwriting data in the handwriting region corresponding to the stored handwriting region information. Thereafter, the controller 100 controls the summary data generator 160 to generate a summary document by documenting the recognized characters and handwriting data.

The input unit 110 includes a key for executing an e-book or e-note function and a key for requesting to display summary data and output a key signal corresponding to the key. In addition, the input unit 110 includes a touch display device, such as a touch pad or touch screen, for inputting user data, such as handwriting data of the user, or a tablet device for imaging handwriting data.

The display unit 120 displays a screen for an e-book or e-note and displays data input via the input unit 110 on an e-paper screen. In addition, the display unit 120 displays summary data in response to a summary data display request.

The memory unit 130 stores an application for performing the e-book or e-note function, information regarding an extracted character region, and information regarding an extracted handwriting region.

The input data recognizer 140 which includes the handwriting recognizer 141 and an indicator recognizer 142, records input point information regarding strokes of input data, stores the input point information in the memory unit 130, determines based on the stored input point information whether the input data is handwriting data or indicator data, and outputs a result of the determination.

The handwriting recognizer 141 recognizes a handwritten character by determining a character pattern corresponding to a stroke input sequence and an input handwriting trace based on the recorded input point information. That is, the handwriting recognizer 141 recognizes a handwritten character by using a general handwritten character recognizing method in which, for example, two-dimensional coordinate values are calculated by sampling input signals in response to a user's input trace, stroke features are extracted based on the calculated two-dimensional coordinate values and an elapsed time according to their associated stroke input sequence, and a character having the most recognizable probability is determined by using the extracted stroke features from among characters previously set to be recognized by using a probability model classifier, such as a Hidden Markov Model (HMM), and output the recognition result.

The indicator recognizer 142 determines a pattern corresponding to a handwriting trace based on the recorded input point information and outputs the determined pattern as indicator data. For example, an indicator may be represented as a straight or wavy line, such as an underline.

The character region extractor 150 including the character recognizer 151, recognizes characters corresponding to recognized indicator data by using the character recognizer 151, and extracts a character region including the recognized characters, which is described in detail with reference to FIGS. 2 and 3, below.

FIG. 2 is a diagram illustrating a character region including characters at a location matched with a location of indicator data according to an embodiment of the present invention, and FIG. 3 is a diagram illustrating a character region including a sentence at a location matched with a location of indicator data according to an embodiment of the present invention.

As illustrated in FIG. 2, if a first indicator 300 and a second indicator 310 are recognized, the character region extractor 150 recognizes characters at a location matched with a location of the first indicator 300 and a location of the second indicator 310 by using the character recognizer 151. The characters recognized at the location of the first indicator 300 are "screen displaying", and the characters recognized at the location of the second indicator 310 are "a touch screen or a tablet input/output screen".

Thereafter, the character region extractor 150 extracts a first character region 301 including the characters recognized at the location of the first indicator 300 and a second character region 311 including the characters recognized at the location of the second indicator 310.

As illustrated in FIG. 3, if a third indicator 400 is recognized, the character region extractor 150 recognizes a sentence at a location matched with a location of the third indicator 400 by using the character recognizer 151. The character recognizer 151 recognizes a character located next to a character or punctuation marks indicating the end of a sentence, period (.), colon (:), semicolon (;), question mark (?), or exclamation mark (!), as the first character of the recognized sentence and the character or the punctuation marks indicating the end of a sentence, such as period (.), colon (:), semicolon (;), question mark (?), or exclamation mark (!), as the end of the recognized sentence. The recognized sentence in this case is "Here, a screen displaying handwriting data thereon may be a touch screen or a tablet input/output screen in a case where an input unit is the touch screen or a device, such as a tablet PC, capable of displaying an input and output screen or an output display screen in a case where an input touch panel and the output display screen are separated."

Thereafter, the character region extractor 150 extracts a third character region 410 including the first character and the last character of the recognized sentence.

If a request for displaying summary data on a screen is received, the summary data generator 160 captures on the e-paper a character image corresponding to the character region and a handwriting image corresponding to the handwriting region that are stored in the memory unit 130. Thereafter, the summary data generator 160 generates summary data by arranging the captured character image and handwriting image to fit in a layout structure of a single page. The summary data may be formed in multiple pages according to a layout size of an e-book or e-note.

As described above, according to an embodiment of the present invention, the user may preview content of an e-book or e-note at a glance by generating content handwritten by the user as summary data, such as a summary image or document.

Figure 4:
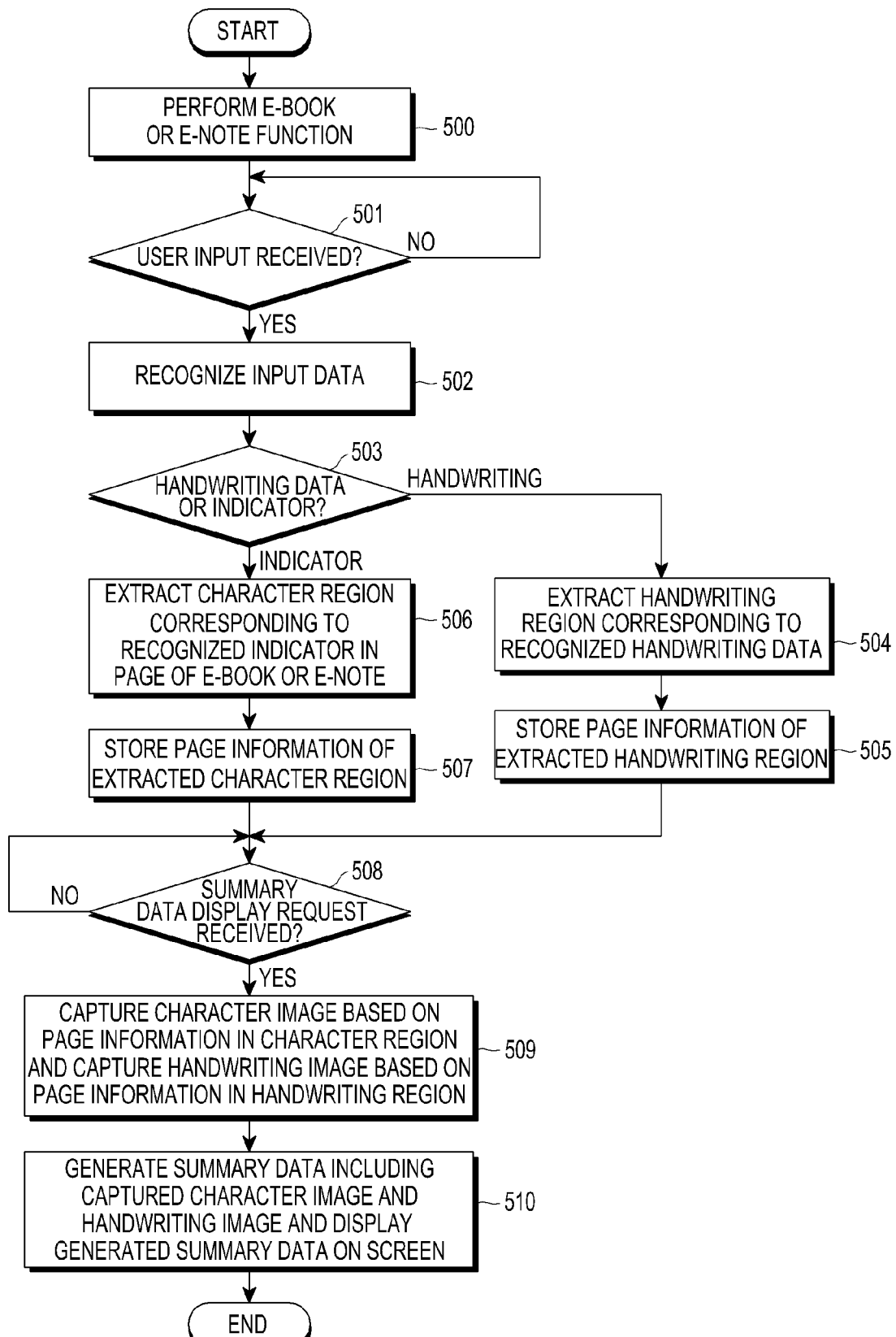
FIG. 4 is a diagram illustrating a process of generating summary data according to an embodiment of the present invention.

FIG. 4 is a diagram illustrating a process of generating summary data according to an embodiment of the present invention.

In this embodiment, it is assumed that an indicator and handwriting data are input and a summary image is generated.

Referring to FIG. 4, in Step 500, the controller 100 performs the e-paper function when a request for executing a function of an e-paper, such as an e-book or e-note, is received through the input unit 110.

In Step 501, the controller 100 determines whether user input data for generating summary data is received through the input unit 110. If the user input data for generating summary data is received, the controller 100 proceeds to Step 502. Otherwise, if the user input data for generating summary data is not received, the controller 100 repeats Step 501 to determine whether the user input data for generating summary data is received.

In Step 502, the controller 100 recognizes the received user input data. In Step 503, the controller 100 determines whether the received user input data is handwriting data or indicator data. If the received user input data is indicator data, the controller 100 proceeds to Step 506. Otherwise, if the received user input data is handwriting data, the controller 100 proceeds to Step 504 to extract a handwriting region corresponding to the recognized handwriting data.

In Step 505, the controller 100 stores information regarding the extracted handwriting region in the memory unit 130. The information regarding the extracted handwriting region includes a page number of the e-paper from which the handwriting region is extracted and location information of the handwriting region on the page.

In Step 506, the controller 100 controls the character region extractor 150 to extract a character region corresponding to the recognized indicator data from a page of the e-paper. The character region corresponding to the recognized indicator data may be a region including characters at a location matched with a location of the indicator data on the page or a region including a sentence at the location matched with the location of the indicator data.

In Step 507, the controller 100 stores information regarding the character region extracted by the character region extractor 150 in the memory unit 130. The information regarding the character region includes a page number of the e-paper from which the character region is extracted and location information of the character region on the page.

In Step 508, the controller 100 determines whether a summary data display request is received. If the summary data display request is received, the controller 100 proceeds to Step 509. Otherwise, if the summary data display request is not received, the controller 100 repeats Step 508 to determine whether a summary data display request is received.

In Step 509, the controller 100 controls the summary data generator 160 to capture a character image corresponding to the character region information and a handwriting image corresponding to the handwriting region information in the e-paper.

In Step 510, the controller 100 generates summary data including the captured character image and handwriting image. The summary data is arranged to fit in a layout structure of the page of the e-book or e-note so that the summary data and the page are synthesized as a single image. If the summary data is out of a height range of the layout structure of the page, the page may be divided into multiple pages.

The controller 100 controls the display unit 120 to display the generated summary data. A screen for displaying the summary data may include at least one character image or include at least one character image and at least one handwriting image.

Figure 5:
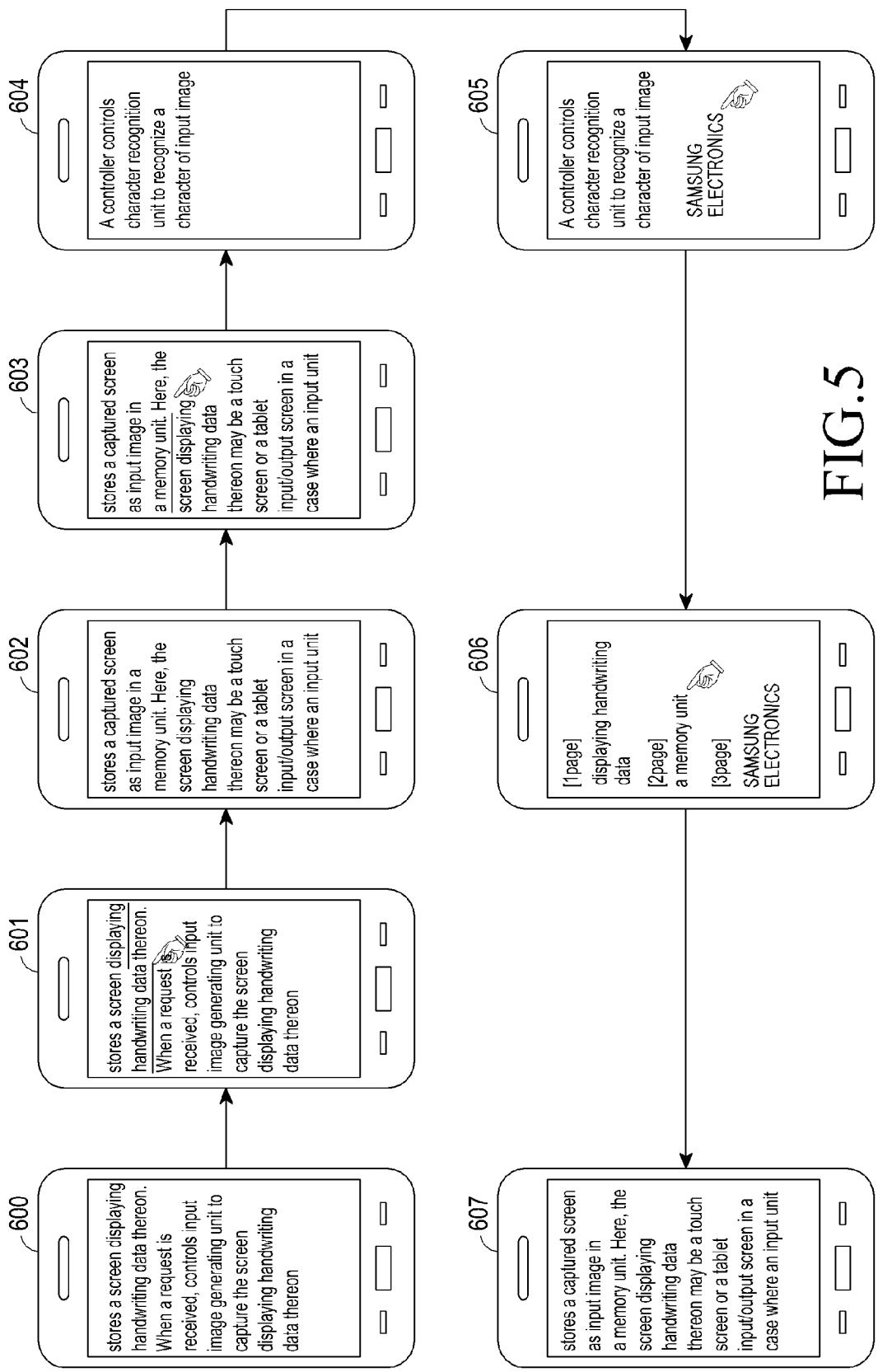
FIGS. 5 and 6 are diagrams illustrating the process of generating summary data according to an embodiment of the present invention.
Figure 6:
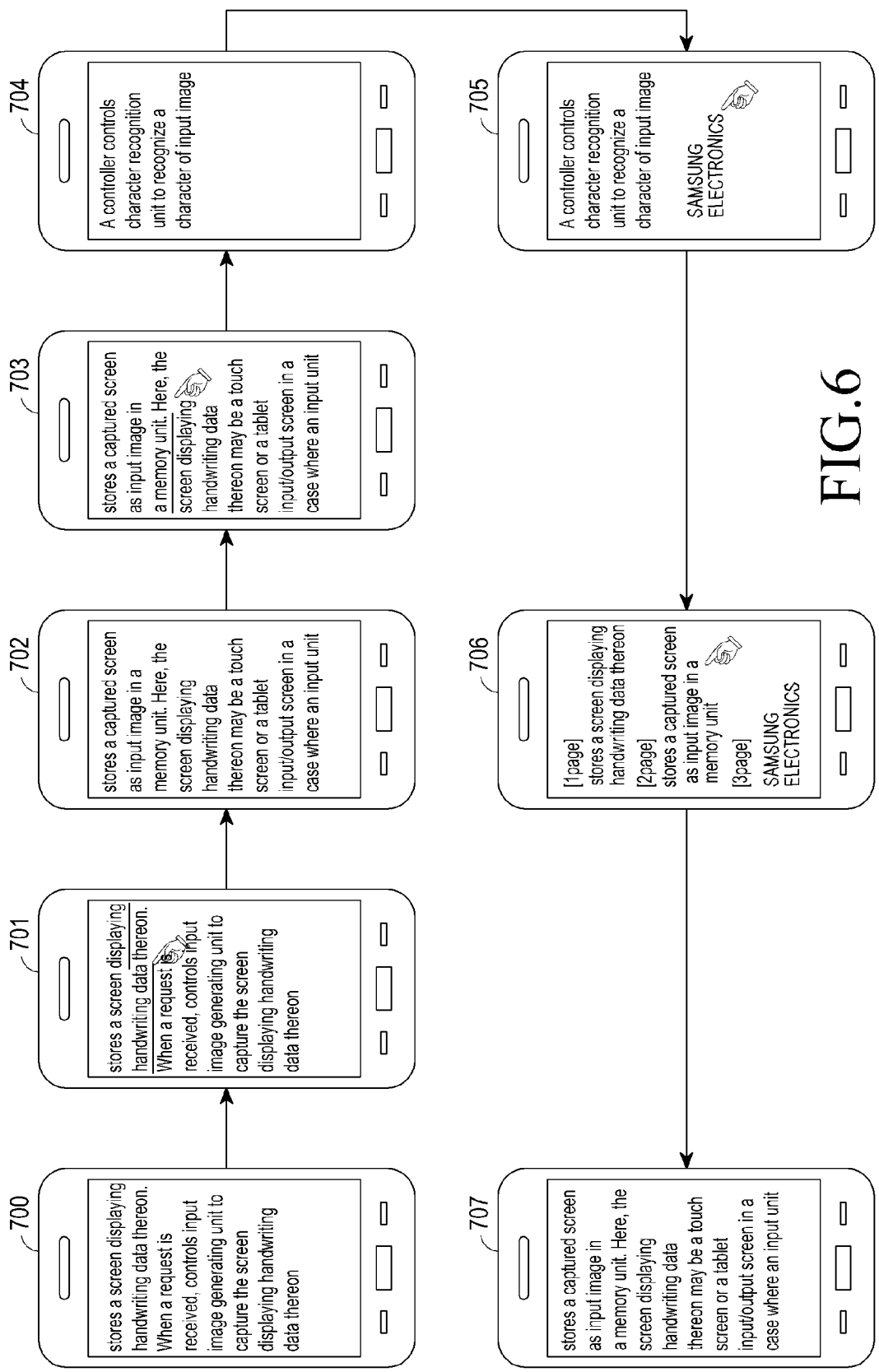

FIGS. 5 and 6 are diagrams illustrating the process of generating summary data according to an embodiment of the present invention.

As illustrated in FIG. 5, a user inputs an underline by a touch input as illustrated by reference numeral 601 while the user is viewing a first page of an e-book as illustrated by reference numeral 600, the user inputs an underline by a touch input as illustrated by reference numeral 603 while the user is viewing a second page of the e-book as illustrated by reference numeral 602, and the user inputs handwriting data as illustrated by reference numeral 605 while the user is viewing a third page of the e-book as illustrated by reference numeral 604.

Thereafter, character regions including characters respectively corresponding to the input underlines and a handwriting region corresponding to the input handwriting data are captured as relevant images to generate single summary data displayed on a screen as illustrated by reference numeral 606, and if a touch input for selecting a specific character image is received, a page corresponding to the specific character image may be directly viewed as illustrated by reference numeral 607.

As illustrated in FIG. 6, a user inputs an underline by a touch input as illustrated by reference numeral 701 while the user is viewing a first page of an e-book as illustrated by reference numeral 700, the user inputs an underline by a touch input as illustrated by reference numeral 703 while the user is viewing a second page of the e-book as illustrated by reference numeral 702, and the user inputs handwriting data as illustrated by reference numeral 705 while the user is viewing a third page of the e-book as illustrated by reference numeral 704.

Thereafter, character regions including sentences including characters respectively corresponding to the input underlines and a handwriting region corresponding to the input handwriting data are captured as relevant images to generate single summary data displayed on a screen as illustrated by reference numeral 706, and if a touch input for selecting a specific character image is received, a page corresponding to the specific character image may be directly viewed as illustrated by reference numeral 707.

Accordingly, by generating content handwritten by a user on an e-book or e-note as summary data, such as a summary image or document, the content handwritten by the user on the e-book or e-note may be previewed at a glance.

In addition, by generating content handwritten by a user on an e-book or e-note as summary data, content of the e-book or e-note may be previewed at a glance from the generated summary data, and by storing location information of a page corresponding to the summary data, a shortcut function may be easily performed by selecting a specific region in the summary data to preview the content.

While the present invention has been shown and described in detail with reference to embodiments thereof, such as a wireless terminal, it will be understood by those of ordinary skill in the art that various changes in form and detail may be made therein without departing from the spirit and scope of the present invention as defined by the appended claims and their equivalents.

What is claimed is:

1. An apparatus for generating a summary of a document displayed on an electronic apparatus, the apparatus comprising:
    a touch screen configured to display the document including at least one page and receive a first input;
    a memory; and
    a controller configured to:
        determine whether a type of the first input is an indicator type or a handwritten type based on point information regarding strokes of the first input,
        control the touch screen to display a handwritten character corresponding to the first input on the displayed document, in response to determining the type of the first input is the handwritten type,
        extract a region including the handwritten character corresponding to the first input, in the document,
        store information regarding the extracted region in the memory, wherein the information regarding the extracted region includes a page number and a location information in the document regarding the extracted region,
        generate the summary of the document using at least one image of the handwritten character captured based on the stored information, in response to receiving a second input for requesting the summary of the document,
        control the touch screen to display the summary of the document including the at least one image of the handwritten character, and
        control the touch screen to display a page of the document corresponding to a first image in the summary of the document, in response to receiving a third input for selecting the first image from the at least one image in the summary of the document.

2. The apparatus of claim 1, wherein the controller is further configured to determine whether the first input is used for generating the summary of the document or not, in response to receiving the first input.

3. The apparatus of claim 2, wherein the controller is further configured to determine the first input is used for generating the summary of the document, if the first input is received after a predetermined input is received, and
    wherein the predetermined input is a predetermined function key input or a predetermined handwriting gesture input for generating the summary of the document.

4. The apparatus of claim 1, wherein the controller is further configured to:
    control the touch screen to display an indicator corresponding to the first input on the displayed document, if the type of the first input is determined as the indicator type.

5. The apparatus of claim 1, wherein the extracted region includes a character region including characters at a location matched with a location of the indicator corresponding to the first input, if the type of the first input is determined as the indicator type, and
    wherein the extracted region includes a handwritten region including the handwritten character corresponding to the first input, if the type of the first input is determined as the handwritten type.

6. The apparatus of claim 5, wherein the at least one image of the handwritten character corresponds to the first input, if the type of the first input is determined as the handwritten type.

7. The apparatus of claim 1, wherein the controller is further configured to generate the summary of the document by arranging the at least one image of the handwritten character captured based on the stored information to fit in a size of a layout of the document.

8. The apparatus of claim 1, wherein the controller is further configured to generate the summary of the document formed in multiple pages, if a size of the at least one image of the handwritten character captured is larger than a size of a layout of the document.

9. The apparatus of claim 1, wherein the controller is further configured to:
    recognize characters included in the at least one image of the handwritten character captured based on the stored information, and
    generate the summary of the document using the recognized characters.

10. A method for generating a summary of a document displayed on an apparatus, the method comprising:
    displaying the document including at least one page;
    receiving a first input;

determining whether a type of the first input is an indicator type or a handwritten type, based on point information regarding strokes of the first input;

displaying a handwritten character corresponding to the first input on the displayed document, in response to determining the type of the first input is the handwritten type;

extracting a region including the handwritten character corresponding to the first input, in the document;

storing information regarding the extracted region, wherein the information regarding the extracted region includes a page number and a location information in the document regarding the extracted region;

in response to receiving a second input for requesting the summary of the document, generating the summary of the document using at least one image of the handwritten character captured based on the stored information;

displaying the summary of the document including the at least one image of the handwritten character; and displaying a page of the document corresponding to a first image in the summary of the document, in response to receiving a third input for selecting the first image from the at least one image in the summary of the document.

11. The method of claim 10, further comprising determining whether the first input is used for generating the summary of the document or not, in response to receiving the first input.

12. The method of claim 11, wherein determining whether the first input is used for generating the summary of the document or not comprises determining the first input is used for generating the summary of the document, if the first input is received after a predetermined input is received, wherein the predetermined input is a predetermined function key input or a predetermined handwriting gesture input for generating the summary of the document.

13. The method of claim 10, wherein displaying the handwritten character corresponding to the first input on the displayed document comprises:

displaying an indicator corresponding to the first input on the displayed document, if the type of the first input is determined as the indicator type.

14. The method of claim 10, wherein the extracted region includes a character region including characters at a location matched with a location of the indicator corresponding to the first input, if the type of the first input is determined as the indicator type, and wherein the extracted region includes a handwritten region including the handwritten character corresponding to the first input, if the type of the first input is determined as the handwritten type.

15. The method of claim 14, wherein the at least one image of the handwritten character corresponds to the first input, if the type of the first input is determined as the handwritten type.

16. The method of claim 10, wherein generating the summary of the document comprises arranging the at least one image of the handwritten character captured based on the stored information to fit in a size of a layout of the document.

17. The method of claim 10, wherein generating the summary of the document comprises generating the summary of the document in multiple pages, if a size of the at least one image of the handwritten character captured is larger than a size of a layout of the document.

18. The method of claim 10, wherein generating the summary of the document comprises:

recognizing characters included in the at least one image of the handwritten character captured based on the stored information; and generating the summary of the document using the recognized characters.

* * * * *